Patented Dec. 6, 1938

2,139,394

UNITED STATES PATENT OFFICE 2,139,394

ESTERS OF POLYMERIZED ORGANIC COMPOUNDS

Adrianus Johannes van Peski, Amsterdam, Netherlands, assignor to Shell Development Company, San Francisco, Calif., a corporation of Delaware No Drawing. Application August 8, 1936, Serial No. 95,040. In the Netherlands August 21, 1935

17 Claims. (Cl. 260—460)

This invention relates to the production of higher molecular organic compounds from unsaturated organic compounds of lower molecular weight. It deals with the manufacture of a novel class of valuable polybasic mineral acid esters and conversion products thereof and particularly with the production of these new products by polymerization of unsaturated compounds and esterification of the resulting unsaturated polymers.

Unsaturated hydrocarbons, particularly olefines of 10 or more carbon atoms per molecule, have been successfully converted to sulfuric acid esters and sulfuric acid ester salts which have found many uses in industry. Such olefines being derived from the cracking of higher hydrocarbons are, however, not only limited in their availability, but also restricted in their properties. Open carbon chains of more than about 20 to 24 carbon atoms in length are practically unobtainable and highly branched structures such as produce desirable oil solubility are usually absent.

I have now found that acid esters of mineral acid acting acids and conversion products thereof having almost any desired molecular weight and a wide variety of hydrocarbon structures may be obtained by reacting mineral acid acting acids with polymers or condensation products of unsaturated organic compounds. Furthermore by proper choice of unsaturated starting material and condensation or polymerization agent and reaction conditions, unsaturated products of predetermined structure and composition may be produced. That is the polymerization or condensation step may be controlled to insure the production of a preponderance of one desired product or of a mixture of predictable proportions and the desired product or products may have a variety of different structures and properties. Compounds of very high molecular weight may thus be obtained.

The acid esters so produced are not only useful as such, particularly as wetting, dispersing and washing agents, but also are capable of conversion to a wide variety of other valuable products including the corresponding alcohols, ethers, esters and salts of the acid esters, for example.

Typical starting materials which are suitable for the production of the compounds of my invention are unsaturated hydrocarbons, particularly aliphatic and alicyclic hydrocarbons unsaturated in the aliphatic chain such, for example, as olefines, e. g. ethylene and secondary base olefines including propylene, butene-1 and -2, pentene-1 and -2, secondary hexylenes (both iso and normal) and higher homologues, di-olefines, as butadiene, isoprene, etc., hydrocarbons containing triple bonds such as acetylene, and aralkyl hydrocarbons as styrene, vinyl naphthalene, divinyl benzene, and the like and other compounds having an unsaturated aliphatic radical such as vinyl cyclohexene, butenyl aniline and homologues and analogues and suitable substitution products thereof.

Suitable substitution products of unsaturated hydrocarbons which may be used in lieu of, or in connection with, the above described starting materials are, for example, the unsaturated alcohols as allyl alcohol, 1.8 octadecene diol, oleic alcohol and the like and unsaturated acids such as oleic, ricinoleic, erucic, muconic and isopropylidene pimelic acids, etc. Unsaturated ketones, unsaturated ethers and other suitable oxygen-containing derivatives may also be used. Other substituents which may be present in the unsaturated starting compound or compounds, include halogen, and amino, nitro, sulfonyl and like groups which may be, but more preferably are not, reactive under the operating conditions.

For the purpose of making my invention more clear it will be described with more particular reference to the manufacture of polybasic mineral acid esters of polymerization products of aliphatic unsaturated hydrocarbons and conversion products thereof. It will be understood, however, that this implies no limitation on the scope of my invention as the principles thus illustrated may be applied to the treatment of a wide variety of other polymerization and condensation products.

Suitable sources of olefines and/or di-olefines which may be used in this application of my process are, for example, hydrocarbons derived from mineral oils, as petroleum, shale oil, and the like, or from mineral oil products, or from natural gas or from tar oils or paraffin wax, etc., or from coal, peat, and like carboniferous natural materials, as well as from animal and vegetable oils, fats and/or waxes. The unsaturated hydrocarbons present in such starting material may be of natural occurrence, or the result of vapor or liquid phase cracking or dehydrogenation, distillation or other pyrogenetic treatment. The unsaturated hydrocarbons may be used in a pure state either as individual compounds or pure mixtures of unsaturates or in admixture with paraffins or other compounds which may be considered inert in the process. Furthermore such unsaturated hydrocarbons may comprise hydrocarbon fractions consisting of, or predominating in, hydrocarbons containing the same number of carbon atoms per molecule or of mixtures of non-isomeric hydrocarbons. Tertiary-base olefines (iso-olefines which yield tertiary derivatives) such as isobutylene, tri-methylethylene, unsymmetrical methylethyl-ethylene, and the like, may be present in the hydrocarbon mixture used as raw material, and may also be used alone or in admixture with each other as starting material although their tendency to form polymers in which the double bond is connected to a carbon atom joined to two other carbon atoms makes them less desirable unless the polymerization is carried out under conditions which promote rearrangement or interpolymerization with other types of unsaturated compounds whereby polymers which contain double linkages which more readily add mineral acid acting acids are formed.

Suitable alternative sources of unsaturated hydrocarbons comprise, dehalogenation of halogenated hydrocarbons and dehydration of alcohols. In either case the olefine formation may be conducted simultaneously with the olefine polymerization, for example, an alcohol, preferably a primary or secondary alcohol of three or more carbon atoms or a mixture of such alcohols with or without one or more tertiary alcohols, may be treated with a strong acid acting condensation agent such as strong sulfuric acid, zinc or aluminum chloride or the like or the alcohol may be passed in the vapor phase at suitable temperatures, pressures and rates over dehydration catalysts, e. g. $Al_2O_3$, etc., so that polymerization products are produced immediately on dehydration.

Polymerization and/or condensation of the chosen unsaturated starting material may be effected in a number of different ways depending upon the product or products desired. Egloff et al. described a wide variety of different suitable polymerization methods in volume 35 of the Journal of Physical Chemical, pages 1825 to 1903 (July, 1931) for example. Thus resort may be had, for example, to heating, most preferably under pressure, with or without catalysts, or the silent electric discharge may be used. The use of chemical agents such as zinc chloride, floridine, boron fluoride, phosphoric acid on pumice and the like facilitates control of the polymerization although mixed products usually result. For the production of individual polymers or isomeric mixtures, I therefore prefer to carry out the polymerization by selectively absorbing the chosen unsaturated hydrocarbon or hydrocarbons in a suitable acid acting medium, such as an aqueous solution of

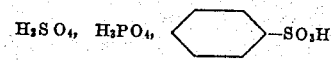

$H_2SO_4$, $H_3PO_4$, ⬡—$SO_3H$ or the like, for example, and then heating the resulting absorption product. The time of treatment during absorption and/or polymerization being adjusted in accordance with the character of the unsaturated hydrocarbons involved, the nature and concentration of the polymerizing agent used, and the temperature at which the operations are carried so that not only the degree but also the nature of the polymerization may be controlled. Thus for the production of true polymers, that is, products of interaction of a single olefine, for example, it is preferable, in order to obtain the highest yields, to selectively absorb that olefine and carry out the polymerization with the resulting absorption product or olefine regenerated therefrom. While for the production of interpolymerization products of, for example, an olefine with a different unsaturated hydrocarbon, the two unsaturates may be absorbed together in the same acid solution. Most preferably the less active compound is absorbed first and then the more reactive compound is absorbed in the resulting acid liquid. If necessary, suitable adjustment of the acid concentration may be made between the two absorption steps. In general, it is advantageous to use an excess of the less reactive unsaturated hydrocarbon. In this manner very accurate control of the composition of the product may be maintained. For the production of higher polymer, particularly where olefines alone are used, more active catalysts such as $AlCl_3$, etc., are desirable. In any case, the polymerization is preferably carried out under conditions which avoid undue decomposition, resinification, and other undesirable side reactions.

The polymerization products obtained may be used in the crude form as produced or after suitable purification or, particularly where individual chemical compounds or mixtures of limited boiling range are desired, after fractionation as by distillation, selective solvent extraction, or the like. In any case the unsaturated polymers or condensation products may be reacted, in whole or in part, with suitable mineral acid acting acids to form novel esters which may be converted by hydrolysis to the corresponding alcohols or used to prepare other derivatives.

Suitable acids which may be used as reaction media for the unsaturated polymers or condensation products so obtained are mineral acid acting acids of which sulfuric, pyrosulfuric, dithionic, phosphoric, pyro and meta phosphoric, benzene sulfonic, and the like are typical. The concentrations in which such acids should be used for reaction with unsaturated polymers and/or condensation products vary depending upon the character of the unsaturated compound or compounds involved, the presence or absence of inert diluents, and the temperature at which the reaction is carried out. In the practice of my invention I preferably adjust the reaction conditions so that substantially only acid addition occurs and further polymerization, tar formation and other undesirable side reactions are reduced to a minimum. Advantageously, procedures analogous to those for the production of mineral acid esters of unpolymerized olefines described in my copending application with Tulleners, Serial No. 28,215, filed June 24, 1935, may be used. Where an acid such as $H_2SO_4$ is used, a concentration within the range of about 80% to about 95% is preferable, using a temperature of about 0° C. to about 25° C. and a quantity of acid at least equivalent to about one mol per double bond present in the polymer being treated, but more or less drastic reaction conditions may also be used in certain cases.

A specific example of the results obtainable by a procedure comprised within the scope of my invention will be of assistance in showing its value in connection with the production of new sulfuric acid esters having a considerably higher molecular weight than those obtainable from unsaturated hydrocarbons heretofore used.

200 gr. of a hydrocarbon mixture consisting of 32% by weight of a butadiene fraction (obtained by cracking a benzine fraction and containing 84.6% butadiene and 15.4% n-butene) and 68% by weight of a hexene fraction (from vapor phase cracking distillate of spraying wax) was introduced in 1¼ hours into 180 gr. benzene while stirring and gradually adding 4.4 gr. AlCl₃, the reaction temperature being kept at 26 to 28° C. Finally the mixture was stirred for another 17 hours at room temperature. During this treatment 12 gr. of the most volatile reaction components appeared to have escaped. After decomposition with dilute hydrochloric acid and subsequent washing with water a distillation to 150° C. bath temperature at 20 mm. pressure was carried out. 116 gr. of a yellow-brown oil with drying properties was obtained as residue.

To 69.0 gr. of this oil there was added in 20 minutes, while stirring, 33.1 gr. H₂SO₄ of 90% concentration. By cooling in ice and salt the temperature was kept at 14 to 17° C. Finally 10 cm³. of aromatic-free benzine was added in order to ensure that the highly viscous homogeneous mass could be adequately stirred. Then the mass was stirred for another 50 minutes at 15 to 17° C. and subsequently poured into 100 gr. of ice. The water layer obtained appeared to be only of a weakly acid nature (0.01 n). The sulfated product was a fairly viscous oil.

A sulfation product obtained as above described was heated with water for 2 hours at 100° and then steamed for 4 hours (considerable emulsification). Only a slight amount of oil passed over. The residue in the flask was taken up in benzene, shaken twice with water and then concentrated to 100° C. bath temperature at 20 mm. pressure. The distillation residue, the desired alcohol, was a brown, highly viscous oil with a hydroxyl number of about 28.

Another sulfation product similarly obtained was neutralized with a solution of caustic soda (10%) while adding water (until an alkaline reaction on litmus was obtained). Thus there was formed a doughy mass which took up a fair amount of water. From time to time the mass was slightly heated on the steam bath to make it easier to stir. After neutralization it was taken up in ether. The etherial solution was centrifuged and concentrated at 100° C. bath temperature at 20 mm. pressure. The residue was a yellow tough mass, insoluble in water but soluble in mineral oil. The sodium content was 2.2%.

The process of my invention generally makes it possible to prepare mineral acid esters, e. g. alkyl phosphates, and the like as well as alkyl and alicyclic sulfates, which may not only have higher molecular weights than those obtainable, for example, by sulfating olefines obtained from natural products but also may, and generally do, have a different and more complex, hydrocarbon structure. These esters, particularly the acid and/or neutral sulfates and phosphates have many varied applications as such. The acid sulfates of unsaturated polymerization products of unsaturated hydrocarbons particularly the sulfates of polymers having at least 8 carbon atoms per polymer molecule, are, for example, valuable wetting agents, dispersing agents and the like. They may also be converted not only to alcohols and salts of acid alkyl sulfates as shown in the above example, but also to ethers and organic esters of those alcohols as well as to other derivatives by conventional procedures. From the corresponding alkali metal salts may be obtained soaps of very high molecular weight which are much more readily soluble in organic media than the lower molecular soaps and which may, therefore, be used for many purposes for which the usual soaps are much less satisfactory, such, for example, as for dry-cleaning soaps, for spray oils, for stabilizing coal-in-oil, and the like.

While I have described my invention in a detailed manner and provided specific examples illustrating suitable modes of executing the same, it is to be understood that modifications may be made and that no limitations other than those imposed by the scope of the appended claims are intended.

I claim as my invention:

1. In a process of producing higher molecular organic compounds from a mono-olefine of lower molecular weight the steps comprising polymerizing said olefine to a higher molecular non-resinous open chain olefinic hydrocarbon, and reacting the product with a polybasic mineral oxy acid to form the corresponding ester.

2. In a process of producing higher molecular organic compounds from unsaturated organic compounds of lower molecular weight the step of reacting a non-resinous unsaturated compound of the class consisting of copolymers and interpolymers of organic compounds containing an unsaturated aliphatic radical with a polybasic mineral oxy acid to form the corresponding ester.

3. In a process of producing higher molecular organic compounds from unsaturated hydrocarbons of lower molecular weight the steps comprising polymerizing olefine containing hydrocarbon to produce a non-resinous unsaturated hydrocarbon of higher molecular weight and reacting the product with aqueous sulfuric acid at a temperature not above 25° C. for a time at which substantially only addition of H₂SO₄ at the olefinic bond of said polymer takes place and the corresponding sulfuric ester is formed.

4. In a process of producing higher mineral acid esters from unsaturated hydrocarbons of lower molecular weight the steps comprising reacting together unsaturated hydrocarbons containing an unsaturated aliphatic radical in the presence of a metallic halide catalyst to produce a non-resinous unsaturated polymerization product and reacting said product with a polybasic mineral oxy acid at a temperature not above 25° C. for a time at which substantially only addition of said acid to said polymerization product takes place and the corresponding ester is formed.

5. In a process of producing higher molecular sulfuric acid esters from a mono-olefine of lower molecular weight the steps comprising polymerizing said olefine to a higher molecular non-resinous open chain olefinic hydrocarbon and reacting the product with sulfuric acid to form the corresponding acid sulfuric acid ester.

6. In a process of producing higher molecular sulfuric acid esters from unsaturated hydrocarbons of lower molecular weight the steps comprising polymerizing a hydrocarbon containing an unsaturated aliphatic radical to a higher molecular non-resinous unsaturated hydrocarbon and reacting the product with sulfuric acid of about 80% to 95% concentration at a temperature and for a time at which substantially only addition of H₂SO₄ to said polymerization product takes and the corresponding acid sulfuric acid ester is formed.

7. A polybasic mineral oxy acid ester of a non-resinous unsaturated polymer of an organic compound which compound had contained an unsaturated aliphatic radical.

8. A polybasic mineral oxy acid ester of a non-resinous unsaturated polymerization product of an unsaturated aliphatic hydrocarbon.

9. A polybasic mineral oxy acid ester of a non-resinous unsaturated polymerization product of an olefine which ester is free from other mineral acid groups.

10. A polybasic mineral oxy acid ester of a non-resinous unsaturated polymerization product of a di-olefine.

11. A polybasic mineral oxy acid ester of a non-resinous unsaturated polymerization product of a hexene.

12. A polybasic mineral oxy acid ester of a non-resinous unsaturated polymerization product of a butadiene.

13. A polybasic mineral oxy acid ester of a non-resinous unsaturated interpolymerization product of a mono-olefine and a di-olefine.

14. A polybasic mineral oxy acid ester of a non-resinous olefinic polymer of a cyclic hydrocarbon having at least one olefinic group which ester contains not more than one mineral acid radical per olefinic bonds in said polymer.

15. A polybasic mineral oxy acid ester of a non-resinous styrene polymer said ester being free from sulfonic acid groups.

16. An acid sulfate of a non-resinous unsaturated polymer of an organic compound which compound had contained an unsaturated aliphatic radical said ester being free from sulfonic acid groups.

17. A wetting and emulsifying agent substantially comprising a higher molecular organic compound of the class consisting of acid sulfates of non-resinous unsaturated open chain polymers of unsaturated open chain hydrocarbons which polymers have at least 8 carbon atoms per molecule and alkali metal salts of said acid sulfates.

ADRIANUS JOHANNES van PESKI.